United States Patent Office 3,441,589
Patented Apr. 29, 1969

3,441,589
THIOL ADDUCTS OF UNSATURATED ESTERS AND PREPARATION OF SAME
Alexis A. Oswald, Mountainside, N.J., assignor to Esso Research and Engineering Company, a corporation of Delaware
No Drawing. Filed June 1, 1965, Ser. No. 460,565
Int. Cl. C07c 153/01; B01j 1/10
U.S. Cl. 260—455                                              18 Claims

ABSTRACT OF THE DISCLOSURE

Thiol compounds such as mercaptans, dimercaptans, and thiolcarboxylic acids are selectively added to esters formed by the reaction of maleic acid, fumaric acid, or maleic anhydride with terminally unsaturated alcohols, in particular allyl alcohol, at either the terminal double bonds of the ester functionality or at the maleic or fumaric side of unsaturation with the use of either free radical or ionic catalysts. Free radical catalysis causes the thiol addition to occur selectively at the terminal double bond of the ester functionality whereas ionic catalysts promote the addition of the thiol to the esters at either the maleic or fumaric double bond. Linear and crosslinked polythioether esters can be formed with the process technique. Adducts of diallyl maleate and thiocarboxylic acids are effective pesticides.

---

This invention relates to novel thiol adducts of the maleic or fumaric esters of terminally unsaturated alcohols, a novel method for their preparation, and to the utilization of certain products of this process as novel pesticidal compositions. More particularly, this invention relates to a process for the direct preparation of thioether-substituted maleic and fumaric esters as well as linear and crosslinked polythioether esters by addition of different thiols to maleic and fumaric anhydrides and esters under varying catalytic conditions and to the use of certain products of this process as novel in fungicides and nematocides.

In recent years, more and more research activity has been directed to the synthesis of unsaturated monomers that can be readily polymerized to high molecular weight plastics and to low molecular weight surface coatings. Discovery of monomers formed from inexpensive readily available materials has presented a continuing object of search. Additionally, it is known in the art that some organic sulfur-containing compounds possess properties which make them suitable as agricultural chemicals. The importance of these materials has stimulated interest in other compounds which may possess comparable properties and methods for producing these compounds.

It has now been discovered that simple thiols such as mono- and dimercaptans and thiocarboxylic acids may be selectively added directly to ester reaction products formed by the reaction of maleic acid, fumaric acid or maleic anhydride with thermally unsaturated alcohols at either the double bonds of the ester functionality or at the maleic or fumaric site of unsaturation by the use of either free radical or ionic catalysis. The products of the reaction, depending upon the type of thiol used and the nature of the catalyst, may be either mono- or diester thiols, linear ester-thioether intermediates or cross-linked polyester-thioether polymers. Furthermore, it has now been found that selected products of the above-described process may be employed in commercially practical concentrations as pesticidal compositions.

The organo-sulfur adducts of this invention can be represented by the following strucural formulas:

(A)  X—CH₂—CHR₂—R₁—O₂C—CH
                    =CH—CO₂—R₁—CR₂=CH₂

(B) 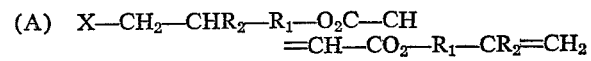

(C) 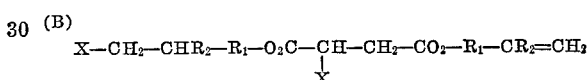

(D) 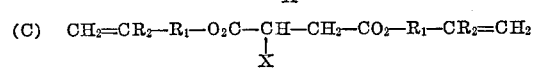

(E)  X—CH₂—CHR₂—R₁—O₂C—CH
                    =CH—CO₂—R₁—CHR₂—CH₂—X

Representative, nonlimiting examples of the reactions contemplated by the process of this invention include:

I. 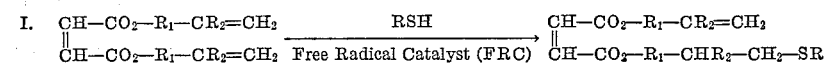

II. 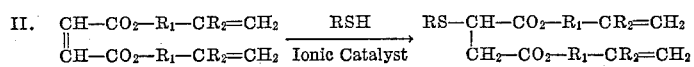

III. 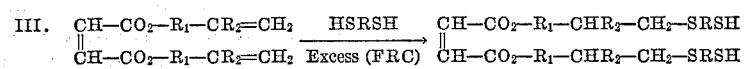

IV. 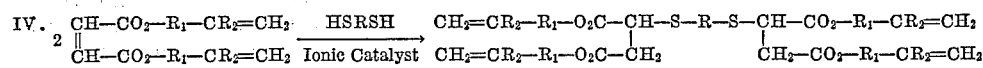

V. 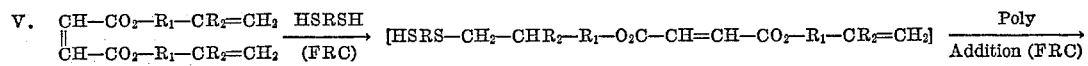

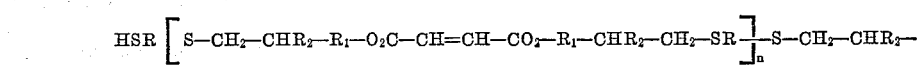

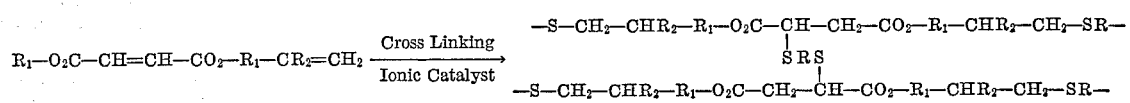

VI. 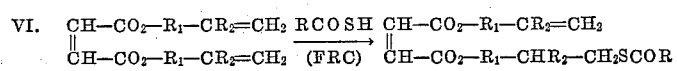

wherein X is a —SR, —SRSH, or —SCOR radical; R is a hydrocarbon radical, normally a straight chain, branched chain or cyclic alkyl or alkylene group having from 1 to 30 carbon atoms, preferably from 1 to 12 carbon atoms or an aryl or aralkyl group having from 6 to 20 carbon atoms as well as their halogen, hydroxy, and carboxy substituted derivatives; $R_1$ is a straight or branched chain two valent alkylene group having from 1 to 5 carbon atoms; $R_2$ is a straight or branched chain alkyl or alkylene group having from 1 to 5 carbon atoms or hydrogen; and $n$ varies from 2 to 30, preferably from 5 to 10.

The preferred thiol reactants are mono- and dimercaptans and thiolcarboxylic acids. Thiolcarboxylic acid reactants are particularly valuable since the products of the process designated by reaction VI possess valuable pesticidal properties, especially when applied as nematocides. Particularly preferred examples of such thiol reactants are ethyl, propyl, butyl, t-butyl, phenyl, n-dodecylmercaptan, trimethylenedithiol, polytrimethylenethioether dithiol, thiolacetic acid, thiolbutyric acid, thiolcaproic acid, etc. As stated previously, the particularly useful ester reagents are the reaction products of maleic or fumaric acid with a $C_3$ to $C_8$ terminally unsaturated alcohol such as allyl alcohol. The preferred ester reagents are diallyl maleate or diallyl fumarate because of their ready availability at very low cost.

The equations set forth previously demonstate several of the distinctive features of the present invention. In reaction I, if $R_1$ were a methylene radical and $R_2$ were a hydrogen radical the ester reacted would be diallyl maleate. Reaction I demonstrates the addition of the thiol compounds occurs selectively at the allylic double bonds of the diallyl maleate when free radical catalysis is used. In contrast as shown by Equation II, again assuming the ester reacted is diallyl maleate, thiol addition takes place exclusively at the maleic or fumaric double bonds of the diallyl esters under the influence of ionic catalysis. Equations III and IV demonstrate that the same phenomena exists when dithiols are used as the thiol reactant. The equation set forth under V illustrates both the synthesis of linear and crosslinked polythioether esters.

The selective thiol addition to the sites of unsaturation in the ester functionality of maleic and fumaric esters by the use of free radical catalysis and the selective thiol addition to maleic or fumaric double bonds of maleic or fumaric esters with ionic catalysts appears to be a phenomena limited to fumaric and maleic esters. For example, thiol addition to compounds such as allyl methacrylate and allyl acrylate occurs almost exclusively at the acrylic sites of unsaturation when free radical catalysis is utilized. This finding is unexpected, as from experience with the maleic and fumaric ester system, it would be expected that thiol addition would occur selectively at the allylic double bonds under the influence of free radical catalysis rather than at the acrylic site of unsaturation.

The above-described reactions are normally carried out in the presence of a catalyst. The catalysts employable in the novel reactions of this invention are either free-radical type initiators or ionic catalysts. Typical free-radical initiators are ultraviolet light, gamma radiation and a wide variety of peroxidic and azo compounds. Useful free-radical initiators include cumene hydroperoxide, tertiary butyl hydroperoxide, bistertiary butyl peroxide, dicumyl peroxide, and bis-azoisobutyronitrile. Irradiation is the preferred free-radical initiator in the process of this invention. Useful ionic catalysts include aliphatic mono- and diamines wherein the alkyl groups in said amines have from 1 to 22, preferably 1 to 4, carbon atoms per alkyl group, alkali metal hydroxides such as sodium hydroxide, ammonia, alkali metal oxides such as sodium oxide and alkali metal alcoholates such as sodium methylate. When a free-radical initiator compound or ionic compound is employed, they will normally constitute from 0.01 to 20, preferably from 1 to 5, mole percent of the total process reactants.

A wide variety of reaction conditions may be employed in the process of the present invention. Suitable reaction temperatures are in the range of from −80° to 200° C., preferably from 0° to 80° C., for example 20° C. The reaction pressure is not critical and superatmospheric as well as atmospheric pressures may be employed in the reaction. Typical reaction pressures range from about 0.5 to 50 atmospheres. Preferably the reactions are carried out at about atmospheric pressure.

The reaction is preferably conducted in the absence of solvents, however, solvents may be used. Useful solvents include conventional aliphatic and aromatic hydrocarbon diluents as well as various types of polar solvents. Representative nonlimiting examples of useful solvents include $C_1$ to $C_4$ alkyl alcohols, $C_4$ to $C_8$ straight or branched chain aliphatic hydrocarbon diluents, $C_4$ to $C_8$ alkyl halides, as well as substituted and unsubstituted hydrocarbon aromatic diluents such as benzene, ethyl benzene, and benzyl chloride.

The ratio of reactants is a critical feature of this invention, since the above-described reactions may be carried out in such a manner as to produce either the mono- or dithiol adducts of the unsaturated esters of maleic or fumaric acid. When the mono adduct is desired product of the reaction, suitable molar ratios of ester to thiol vary from 0.1 to 2, preferably 0.3 to 1. When the thiol diadduct is the desired major reaction product, the above-described reaction may be carried out by employing equivalent amounts of reactants, i.e., 2 moles of thiol per mole of ester, or alternatively, may be carried out in the presence of an excess of the thiol reactant. Preferably, the molar ratio of thiol to ester ranges about 1 to 3 and preferably from 1.8 to 2.2. When long chain polyester-thioether polymers are desired care should be taken not to use an excess of either the dithiol or the diallyl ester reagent since an excess would tend to result in either very low molecular weight adducts or crosslinked polymers.

The invention will be further understood by reference to the following illustrative examples.

Example 1

A stirred mixture of 25 grams (0.52 mole) of methanethiol and 29 grams (0.025 mole) of diallyl maleate was reacted in a quartz pressure tube in a 15° C. water bath for 4 hours under the influence of ultraviolet irradiation from a 100 watt, wide spectrum, medium pressure Hanau immersion lamp. Then, the unreacted methanethiol was vented and the resulting product was distilled at 0.05 mm. of mercury pressure to yield 11 grams of mono-adduct having a boiling point of 116° to 117° C. and 50 grams of the diadduct having a boiling point ranging from 155° to 158° C. Both compounds were clear colorless liquids. Nuclear magnetic resonance spectra of the products by the unchanged presence of the singlet signal for maleic hydrogens and the absence of significant methyl-doublet signals indicated that a selective anti-Markownikow addition to the allylic double bonds took place. The thiol diadduct was calculated to contain 29.29 weight percent carbon, 6.89 weight percent hydrogen, 21.89 weight percent oxygen and 21.93 weight percent sulfur. A chemical analysis of the diadduct revealed that the product contained 29.27 weight percent carbon, 6.94 weight percent hydrogen, 21.9 weight percent oxygen and 22.16 weight percent sulfur.

Example 2

To a stirred and nitrogenated mixture of 22 grams (0.2 mole) of benzene thiol and 1.4 grams (0.0125 mole) of triethylene diamine was added dropwise 39.2 grams (0.2 mole) of diallyl maleate at room temperature. Upon addition of the diallyl maleate, an immediate exothermic reaction commenced and it was necessary to use an icewater bath to maintain proper temperature. After the completion of the addition, the reaction mixture was distilled at 0.15 mm. of mercury pressure to recover the triethylene diamine catalyst in the forerun and to obtain 57 grams of the mono thiol adduct of diallyl maleate. The product exhibited a boiling point ranging from 152° to 153° C. and was a slightly yellow liquid.

A nuclear magnetic resonance spectrum of the product indicated that the mono-addition occurred exclusively to the maleic double bond and phenylmercaptosuccinic acid diallyl ester was formed.

Example 3

A stirred and nitrogenated mixture of 81 grams (0.75 mole) of trimethylenedithiol and 98 grams (0.5 mole) of diallyl maleate was irradiated at 13° C. for a period of 8 hours. A nuclear magnetic resonance spectrum of the colorless, very viscous reaction mixture indicated that 90 percent of the allylic double bonds reacted, but none of the maleic bonds. After the removal of the unreacted trimethylenedithiol by distillation at 130° C. under 0.5 mm. of mercury pressure for 2 hours, the remaining product had an average molecular weight of 780 as determined by nuclear magnetic resonance techniques. Nuclear magnetic resonance also indicated that 10 percent of the maleic double bonds were isomerized to fumaric double bonds on heating. The nuclear magnetic resonance spectrum corresponded to that of a mixture of the following type of oligomers:

120° C. In a second test, phenyl mercaptan was reacted with diallyl maleate to secure a monoallylic adduct, allyl phenylmercaptopropyl maleate, having a boiling point ranging from 159° to 167° C. at 0.35 mm. Hg pressure. Lastly, thioacetic acid was reacted with diallyl maleate to obtain a monoallylic adduct, allyl acetylmercaptopropyl maleate possessing a boiling point varying from 133° to 136° C. at 0.1 mm. Hg pressure.

Example 6

To further demonstrate the flexibility of the process of this invention, diallyl maleate or diallyl fumarate were reacted with various types of thiol compounds in the presence of several types of amine catalysts to secure maleic and fumaric adducts of the thiol compound. In the first test ethyl mercaptan was reacted with diallyl maleate in the presence of diazobicyclo[2·2·2]octane (triethylene diamine) to form diallyl ethylmercaptosuccinate which exhibited a boiling point varying from 99° to 101° C. at 0.05 mm. Hg pressure. In the second test n-dodecyl mercaptan was reacted with diallyl maleate in the presence of tertiary butyl amine to form a liquid maleic adduct, diallyl-dodecylmercaptosuccinate. In run number 3, tertiary butyl mercaptan was reacted with diallyl maleate at 90° C. for 10 minutes in the presence of triethylene diamine to form diallyl t-butylmercaptosuccinate having a boiling point ranging from 107° to 109° C. at 0.2 mm. Hg pressure. In the fourth test, phenyl mercaptan was reacted with each diallyl maleate and

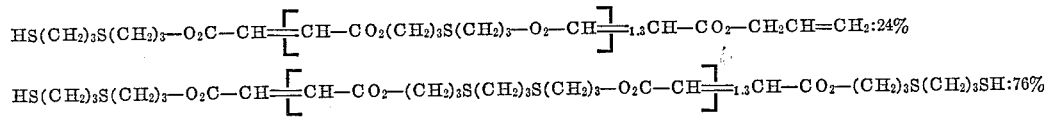

Such oligomers can be reacted with each under the influence of light, peroxide, amine or even on long standing. With ultraviolet irradiation, for example, this product solidified to yield a transparent colorless insoluble polymer.

Example 4

To a stirred and nitrogenated melt of 32 grams (0.02 mole) of polytrimethylenethioether dithiol of the general formula $HS(CH_2CH_2CH_2S)_{20}H$, containing 0.22 gram (0.002 mole) of triethylene diamine catalyst was added 4 grams (0.02 mole) of diallyl maleate at 110° C. The temperature of the reaction mixture was maintained at 110° C. for a period of 10 minutes. Following the heating period the mixture was allowed to solidify. A nuclear magnetic resonance spectrum demonstrated the complete disappearance of maleic (or fumaric) unsaturation and thereby indicated the completion of a maleic addition of the polymeric dithiol.

Example 5

Following essentially the same procedure as is set forth in Example 1, a series of mono-adducts of the various thiol compounds and diallyl maleate were prepared to demonstrate the flexibility of the instant invention. In each test the reaction was catalyzed by the use of ultraviolet radiation. In the first test ethylmercaptan was reacted with diallyl maleate to secure a monoallylic adduct, allyl ethylmercaptopropyl maleate, having a boiling point at 0.05 mm. of mercury pressure ranging from 117° to diallyl fumarate in the presence of triethylene diamine to form diallyl phenylmercaptosuccinate. Each adduct exhibited a boiling point varying from 152° to 153° C. at 0.2 mm. pressure. Lastly, thioacetic acid was reacted with diallyl maleate in the presence of triethylene diamine to form a maleic adduct, diallyl acetylmercaptosuccinate, which had a boiling point of about 141° to 143° C. at 0.8 mm. Hg pressure.

Example 7

To further demonstrate the flexibility of the present invention various dithiol compounds were reacted with diallyl maleate using free radical and ionic catalysis to form a multiplicity of products. In the first test, substantially equimolar amounts of trimethylene dithiol were reacted with diallyl maleate for a period of 8 hours under the influence of ultraviolet light to secure a polymaleic ester of methylene bis (methylene mercapto propanol) having the following structural formula:

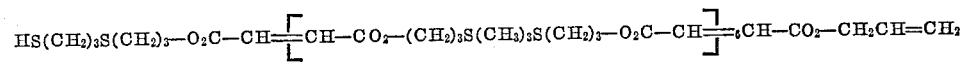

The above addition polyester was a very viscous liquid that is an excellent intermediate for further polymer synthesis as it is easily crosslinked because of internal sites of unsaturation and has additional terminal unsaturation for further polymerization.

When a mixture of one mole of each of diallyl maleate and 1,2-propanedithiol were reacted under similar conditions, 25.5 g. of the corresponding monoadduct,

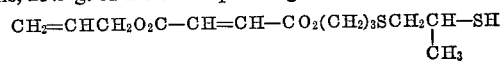

could be isolated as a clear, colorless liquid boiling between 170–176° C. at 0.35 mm. Hg pressure. The larger residual product (40.5 g.), however, was again a polymeric adduct.

In another test one mole of trimethylene dithiol was reacted with two moles of diallyl maleate in the presence of triethylene diamine to yield a liquid tetraallyl tetraester having the following general formula:

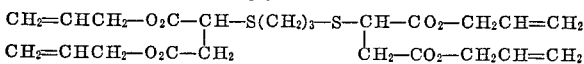

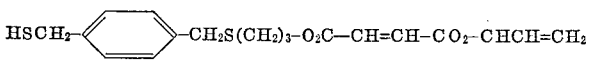

The above tetraalkyl tetraester is again an excellent polymer intermediate as it contains four sites of terminal unsaturation.

Lastly, substantially equimolar amounts of diallyl maleate and para-xylylene dimercaptan were reacted to form 4 - mercapto - methyl - phenylmethylmercaptylpropyl allyl maleate having the general formula set forth below:

HSCH₂—⟨  ⟩—CH₂S(CH₂)₃—O₂C—CH=CH—CO₂—CHCH=CH₂

The above compound is a very viscous liquid and is an extremely desirable intermediate for polymeric surface coatings as it contains both internal and terminal sites of unsaturation.

Example 8

To further demonstrate the flexibility of the process of the present invention, a thiolcarboxylic acid was reacted with diallyl maleate to form the monoallylic adduct. The adduct was prepared by reacting 16 grams (0.2 mole) of 95 percent thiolacetic acid (containing about 5 percent acetic acid impurity) dropwise to 39.2 grams (0.2 mole) of diallyl maleate containing 8 percent diallyl fumarate impurity with stirring under a nitrogen atmosphere. Free radical catalysis was employed. A sample of the resulting liquid reaction mixture was analyzed using proton magnetic resonance spectroscopy. The spectrum of the mixture indicated that half of the allylic protons disappeared as expected in a complete and selective allylic addition reaction of thiolacetic acid. The intensity of the signal for maleic protons remained unchanged indicating no addition to that double bond.

Fractional distillation of the reaction mixture in vacuum recovered 7.9 grams (20 percent) diallyl maleate containing 8 percent diallyl fumarate as a forerun at 66° to 67° C. at 0.1 mm. of mercury pressure. Continuing the distillation, 31 grams of the allylic monoadduct as a colorless liquid was recovered in several fractions between 128° to 136° C. at 1 mm. of mercury. Proton magnetic resonance spectroscopy and gas chromatographic analysis of these fractions indicated that the overall percentage of maleic and fumaric monoadducts was 92 percent and 8 percent respectively. This indicated that no isomerization of the maleate to the fumarate took place on monoaddition. The allylic monoadduct n-(3-acetylthio)-propyl allyl maleate, had the following general formula:

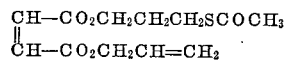
ĊH—CO₂CH₂CH=CH₂

Analysis of the liquid distillation residue (10 grams) indicated that it consisted mostly of allylic diadducts of diallyl fumarate and maleate. The composition of the allylic monoadduct was confirmed by elemental analysis. From an empirical formula of C₁₂H₁₆O₅S the composition was calculated to contain 52.92 weight percent carbon, 5.92 weight percent hydrogen, 29.38 weight percent oxygen, 11.77 weight percent sulfur. The analysis revealed 52.95 weight percent carbon, 5.96 weight percent hydrogen, 29.0 weight percent oxygen and 11.95 weight percent sulfur.

Example 9

A reaction of thiolacetic acid to diallyl fumarate was carried out in essentially the same manner as the experiment described in Example 8. A spontaneous reaction was indicated by a temperature rise on addition of the thiolacetic acid to the diallyl fumarate. Nuclear magnetic resonance and gas chromatographic analysis indicated the formation of 95 percent of straight free radical type, n-(3-acetylthio)-propyl allyl fumarate, and of 5 percent branched ionic type monoallylic adducts having the following structural formulas:

(A) CH₃COS(CH₂)₃O₂CCH
              ‖
              HĊCO₂CH₂CH=CH₂

(B) CH₃COSCHCH₂O₂CCH
         |              ‖
         ĊH₃       HĊCO₂CH₂CH=CH₂

These two components could be separated from the unconverted diallyl fumarate and its diadduct by distillation under vacuum. The two products were obtained between 133° and 142° C. at 0.1 mm. of mercury pressure as components of a colorless liquid distillate. The calculated composition of the monoadduct was confirmed by elemental analysis. From a calculated empirical formula, the compound was expected to contain 52.92 weight percent carbon, 5.92 weight percent hydrogen, 29.38 weight percent oxygen, and 11.77 weight percent sulfur. The analysis revealed that the compound synthesized contained 52.96 weight percent carbon, 5.95 weight percent hydrogen, 28.9 weight percent oxygen and 11.78 weight percent sulfur.

Example 10

In addition to the allylic adducts of thiolacetic acid, a maleic adduct was prepared by introducing 392.2 grams (0.2 mole) of diallyl maleate dropwise at room temperature to a stirred solution of 15 grams (0.2 mole) of thiolacetic acid and 1.4 grams (0.0125 mole) of triethylene diamine. The reaction was conducted under a nitrogen atmosphere. The reaction mixture was left to stand overnight to complete the total addition. Following the reaction period, nuclear magnetic resonance analysis indicated that most of the maleic proton signal disappeared. Distillation of the reaction mixture under vacuum yielded 39 grams of the maleic monoadduct having a boiling point between 135° and 137° C. at 0.7 mm. of mercury. Analysis of the product established that about 95 percent of this monoadduct was the maleic type, i.e., diallyl acetylmercaptosuccinate.

The effect of ionic catalysts was studied in some more detail using 1,3-propanedithiol (trimethylenedithiol). Equimolar amounts of this dithiol and diallyl maleate were reacted in the presence of varying amounts of triethylene diamine. The results are shown in Table I.

TABLE I.—TRIETHYLENEDIAMINE CATALYST CHANGES THE COURSE OF TRIMETHYLENEDITHIOL-DIALLYL MALEATE ADDITION

| Amine Added, Mole percent | Components of Reaction Mixtures by NMR, mole percent | | | | |
|---|---|---|---|---|---|
| | Monoadducts Formed | | Reactants and Isomers | | |
| | Allylic | Maleic | Maleate | Fumarate | Thiol |
| Nil | 5 | 0 | 46 | 2 | 47 |
| 0.005 | 45 | 21 | 9 | 8 | 17 |
| 0.010 | 17 | 50 | 0 | 17 | 16 |
| 0.025 | 0 | 70 | 0 | 15 | 15 |
| 0.050 | 0 | 76 | 0 | 12 | 12 |
| 0.100 | 0 | 84 | 0 | 8 | 8 |
| 0.166 | 0 | 88 | 0 | 6 | 6 |
| 0.500 | 0 | 88 | 0 | 6 | 6 |

The table demonstrates that with increasing amounts of amine more and more maleic addition occurred.

Example 11

The fungicidal action of the thiolacetic acid monoadducts of diallyl maleate and fumarate as prepared in Examples 8, 9 and 10 were tested in various dilutions to determine fungicidal activity. *Monilia fructicola*, the casual organism of brown rot of stone fruit, and *Alternaria solani*, the causal organism of early blight of potato and tomato, were used as test organisms. Captan (N-trichloromethylthio-tetrahydrophthalimide) was used as a standard fungicide. Concentrations inhibiting spore germination for 24 hours were determined and are set forth in the following table:

TABLE II

| Example | Thiolacetic Acid Adduct Tested—Structure | Inhibiting Concentration, Percent | |
|---|---|---|---|
| | | Monilia fructicola | Alternaria solani |
| 8 | $\overset{\text{CHCO}_2(\text{CH}_2)_3\text{SCOCH}_3}{\underset{\text{CHCO}_2\text{CH}_2\text{CH}=\text{CH}_2}{\|}}$ | <0.001 | 0.001 |
| 9 | $\underset{\text{HCCO}_2\text{CH}_2\text{CH}=\text{CH}_2}{\overset{\text{CH}_3\text{COS}(\text{CH}_2)_3\text{O}_2\text{CCH}}{\|}}$ | 0.0010 | 0.0001 |
| 10 | $\underset{\text{CH}_2\text{CO}_2\text{CH}_2\text{CH}=\text{CH}_2}{\overset{\text{CH}_3\text{COSCHCO}_2\text{CH}_2\text{CH}=\text{CH}_2}{\|}}$ | 0.0100 | 0.0010 |
| Control (Captan) | (cyclohexene-CO-NSCCl$_3$-CO) | 0.0001 | 0.0001 |

The above data indicates that the allylic monoadducts of diallyl fumarate and maleate are highly effective fungicides. Their activity against agricultural pests such as *Monilia fructicola* and *Alternaria solani* is about equal to Captan, a widely used commercial fungicide. The maleic monoadduct while not exhibiting activity similar to the allylic adduct was nevertheless partly effective against agricultural pests but at higher concentrations.

Example 12

To demonstrate the nematocidal action of certain thiolacetic acid monoadducts of diallyl maleate and diallyl fumarate a series of tests were conducted. A species of Panagrellus was used as the test organism and mortality data were determined after 24 hours. The control compound used was 4-n-hexylresorcinol. Concentrations resulting in 50 percent kill (control), i.e., $L_D50$'s, are recorded in the following table:

TABLE III

| Example | Thiolacetic Adduct Tested—Structure | Controlling Concentration, $L_D50$ (percent) Panagrellus |
|---|---|---|
| 8 | $\overset{\text{CHCO}_2(\text{CH}_2)_3\text{SCOCH}_3}{\underset{\text{CHCO}_2\text{CH}_2\text{CH}=\text{CH}_2}{\|}}$ | 0.0100 |
| 9 | $\underset{\text{HCCO}_2\text{CH}_2\text{CH}=\text{CH}_2}{\overset{\text{CH}_3\text{COS}(\text{CH}_2)_3\text{O}_2\text{CCH}}{\|}}$ | 0.0001 |
| 10 | $\underset{\text{CH}_2\text{CO}_2\text{CH}_2\text{CH}=\text{CH}_2}{\overset{\text{CH}_3\text{COSCHCO}_2\text{CH}_2\text{CH}=\text{CH}_2}{\|}}$ | 0.1000 |
| Control | (phenyl-OH,-OH,-CH$_2$(CH$_2$)$_4$CH$_3$) | 0.0001 |

Surprisingly, the above data indicate that compounds especially the monoadduct of diallyl fumarate (Example 9) which was a moderately active fungicide is also highly active against eel worms (nematodes). The closely related maleic monoadduct of an amine catalyzed anionic reaction (Example 10) does not possess a comparable pesticidal activity.

The fungicidal and nematocidal compositions of this invention may be employed in either solid or liquid form. When used in solid form, they may be reduced to an impalpable powder and employed as undiluted dust, or they may be admixed with a solid carrier such as clay, talc, or bentonite as well as other carriers known in the art.

The compositions may also be applied as a spray, either alone or in a liquid carrier as a solution in a solvent or as a suspension in a nonsolvent. Typical solvents are organic compounds such as acetone, ethyl alcohol, benzene, naphtha, etc., although different compounds exhibit different solubilities for the novel compositions. In some instances, it may be preferable to admix the composition with wetting agents so as to be able to secure aqueous emulsions and consequent uniformity of dispersion in the resulting colloid system. The use of these wetting agents also increase the wetting action of the spray by decreasing its surface tension. This results in securing better contact of the spray with the surface being treated and, consequently, brings the active ingredient into more intimate contact with the parasite life. Suitable wetting agents include the sulfates of long-chain alcohol such as dodecanol and octadecanol, sulfonated amide and ester derivates, sulfonated aromatic and mixed alkyl aryl derivatives, esters of fatty acids, such as the ricinoleic esters of sorbitol and petroleum sulfonates of $C_{10}$ to $C_{20}$ lengths. The nonionic emulsifying agents, such as the ethylene oxide condensation products of alkylated phenols, may also be employed. The compounds of this invention may, of course, be admixed with carriers that are themselves active fungicidal or nematocidal compositions.

It is to be understood that this invention is not limited to the specific examples which have been offered merely as illustrations and that modifications may be made without departing from the spirit of the invention.

What is claimed is:

1. Organo-sulfur adducts selected from the group consisting of compounds having the general formula:

(A) $\text{X}-\text{CH}_2-\text{CHR}_2-\text{R}_1-\text{O}_2\text{C}-\text{CH}=\text{CH}-\text{CO}_2-\text{R}_1-\text{CR}_2=\text{CH}_2$ (B) $\text{X}-\text{CH}_2-\text{CHR}_2-\text{R}_1-\text{O}_2\text{C}-\underset{\text{X}}{\text{CH}}-\text{CH}_2-\text{CO}_2-\text{R}_1-\text{CR}_2=\text{CH}_2$ (C) $\text{CH}_2=\text{CR}_2-\text{R}_1-\text{O}_2\text{C}-\underset{\text{X}}{\text{CH}}-\text{CH}_2-\text{CO}_2-\text{R}_1-\text{CR}_2=\text{CH}_2$ (D) $\text{X}-\text{CH}_2-\text{CHR}_2-\text{R}_1-\text{O}_2\text{C}-\underset{\text{X}}{\text{CH}}-\text{CH}_2-\text{CO}_2-\text{R}_1-\text{CHR}_2-\text{CH}_2-\text{X}$ (E) $\text{X}-\text{CH}_2-\text{CHR}_2-\text{R}_1-\text{O}_2\text{C}-\text{CH}=\text{CH}-\text{CO}_2-\text{R}_1-\text{CHR}_2-\text{CH}_2-\text{X}$ wherein X is selected from the group consisting of —SR, —SRSH, and —SCOR radicals; R is selected from the group consisting of $C_1$ to $C_{12}$ alkyl and alkylene radicals, a phenyl radical, and a p-xylylene radical; $R_1$ is a methylene radical; and $R_2$ is a hydrogen radical.

2. The organo-sulfur adduct of claim 1 having the general formula:

RS—CH₂—CHR₂—R₁—O₂C—CH=
CH—CO₂—R₁—CR₂=CH₂

3. The organo-sulfur adduct of claim 1 having the general formula:

CH₂=CR₂—R₁—O₂C—CH—CH₂—CO₂—R₁—CR₂=CH₂
|
SR

4. The organo-sulfur adduct of claim 1 having the general formula:

CH₂=CR₂—R₁—O₂C—CH=CH—CO₂—
R₁—CHR₂—CH₂—SCOR

5. The organo-sulfur adduct of claim 1 having the general formula:

HSRS—CH₂—CHR₂—R₁—O₂C—
CH=CH—CO₂—R₁—CR₂=CH₂

6. The composition of claim 1 wherein R is an alkyl group having from 1 to 12 carbon atoms.

7. An organo-sulfur adduct having the general formula:

HSR₊S—CH₂—CHR₂—R₁—O₂C—CH=CH—
CO₂—R₁—CHR₂—CH₂—SR₋ₙS—CH₂—CHR₂—
R₁—O₂C—CH=CH—CO₂—R₁—CR₂=CH₂ wherein R is selected from the group consisting of C₁ to C₁₂ alkyl and alkylene radicals, a phenyl radical, and a p-xylylene radical; R₁ is a methylene radical; R₂ is a hydrogen radical; and n varies from 2 to 30.

8. A process for preparing thiol adducts which comprises reacting a thiol compound having the structural formula selected from the group consisting of RSH, HSRSH, and RCOSH wherein R is selected from the group consisting of C₁ to C₁₂ alkyl and alkylene radicals, a phenyl radical, and a p-xylylene radical with the ester reaction product of a compound having the formula selected from the group consisting of

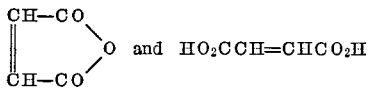

and allyl alcohol at a temperature in the range of −80° to 200° C. and a pressure in the range of 0.5 to 50 atmospheres in the presence of a catalyst selected from the group consisting of ionic catalysts and free radical catalysts, the molar ratio of ester reaction product to thiol compound ranging from 0.1 to 2 for the formation of monoadduct product and the molar ratio of thiol compound to ester reaction product varying from 1 to 3 for the formation of diadduct product.

9. A process for preparing thiol adducts which comprises adding a thiol compound having the structural formula selected from the group consisting of RSH, HSRSH and RCOSH, wherein R is selected from the group consisting of C₁ to C₁₂ alkyl and alkylene radicals, a phenyl radical, and a p-xylene radical to the sites of terminal unsaturation in an ester reaction product of a compound having a formula selected from the group consisting of

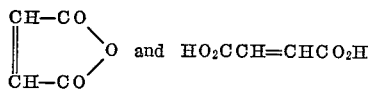

and allyl alcohol at a temperature in the range of −80° to 200° C. and a pressure in the range of 0.5 to 50 atmospheres in the presence of a free radical catalyst, the molar ratio of ester reaction product to thiol compound ranging from 0.1 to 2 for the formation of monoadduct product and the molar ratio of thiol compound to ester reaction product varying from 1 to 3 for the formation of diadduct product.

10. The process of claim 9 wherein the molar ratio of ester reaction product to thiol compound varies from 0.3 to 1.

11. The process of claim 9 wherein the molar ratio of thiol compound to ester reaction product ranges from 1.8 to 2.2.

12. The process of claim 9 wherein R is a C₁ to C₁₂ alkyl group and said process is conducted at a temperature ranging from 0 to 80° C.

13. The process of claim 12 wherein said free radical catalyst is ultraviolet radiation.

14. A process for preparing thiol adducts which comprises adding a thiol compound having the structural formula selected from the group consisting of RSH, HSRSH and RCOSH, wherein R is selected from the group consisting of C₁ to C₁₂ alkyl and alkylene radicals, a phenyl radical, and a p-xylylene radical to the sites of internal unsaturation in an ester reaction product of a compound having a formula selected from the group consisting of

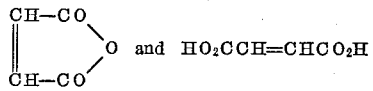

and allyl alcohol at a temperature in the range of −80° to 200° C. and a pressure in the range of 0.5 to 50 atmospheres in the presence of an ionic catalyst, the molar ratio of ester reaction product to thiol compound ranging from 0.1 to 2.

15. The process of claim 14 wherein the molar ratio of ester reaction product to thiol compound varies from 0.3 to 1.

16. The process of claim 14 wherein the molar ratio of thiol compound to ester reaction product ranges from 1.8 to 2.2.

17. The process of claim 14 wherein R is a C₁ to C₁₂ alkyl group and said process is conducted at a temperature ranging from 0 to 80° C.

18. The process of claim 17 wherein said ionic catalyst is an aliphatic amine.

References Cited

UNITED STATES PATENTS

| | | | |
|---|---|---|---|
| 2,467,303 | 4/1949 | Frank | 260—481 |
| 2,818,462 | 12/1957 | Kosmin | 260—481 |
| 2,045,925 | 10/1932 | Remy | 167—22 |
| 2,899,354 | 8/1959 | Kleemann | 167—22 |
| 2,402,560 | 6/1946 | Langkammerer | 260—455 |
| 2,557,639 | 6/1951 | Derr et al. | 260—485 XR |
| 2,257,422 | 6/1966 | Miller | 260—481 XR |

OTHER REFERENCES

Reid: "Org. Chem. of Bivalent Sulfur," vol. II, p. 29 (1958).

Houben-Weyl: "Met. der Organischen Chemie," vol. 9, pp. 750–751 (1955).

CHARLES B. PARKER, *Primary Examiner.*

D. R. PHILLIPS, *Assistant Examiner.*

U.S. Cl. X.R.

204—158; 260—481, 485